United States Patent
Schankula et al.

(10) Patent No.: US 9,513,191 B2
(45) Date of Patent: Dec. 6, 2016

(54) METHOD FOR MONITORING A SUBSYSTEM INSTALLED IN A MOTOR VEHICLE

(75) Inventors: Herbert Schankula, Esslingen (DE);
Markus Richter,
Leinfelden-Echterdingen (DE)

(73) Assignee: Daimler AG, Stuttgart (DE)

( * ) Notice: Subject to any disclaimer, the term of this patent is extended or adjusted under 35 U.S.C. 154(b) by 39 days.

(21) Appl. No.: 14/124,062

(22) PCT Filed: Dec. 10, 2011

(86) PCT No.: PCT/EP2011/006251
§ 371 (c)(1),
(2), (4) Date: Dec. 5, 2013

(87) PCT Pub. No.: WO2012/167810
PCT Pub. Date: Dec. 13, 2012

(65) Prior Publication Data
US 2014/0277904 A1    Sep. 18, 2014

(30) Foreign Application Priority Data

Jun. 9, 2011 (DE) .......................... 10 2011 103 699

(51) Int. Cl.
*F01N 3/00* (2006.01)
*G01M 15/10* (2006.01)
*G01M 15/05* (2006.01)

(52) U.S. Cl.
CPC ............. *G01M 15/10* (2013.01); *G01M 15/05* (2013.01)

(58) Field of Classification Search
USPC .................................................. 701/29–500
See application file for complete search history.

(56) References Cited

U.S. PATENT DOCUMENTS

| | | | |
|---|---|---|---|
| 5,741,958 A | 4/1998 | Denz et al. | |
| 6,260,411 B1 * | 7/2001 | Esteghlal | F02D 41/22 73/114.54 |

(Continued)

FOREIGN PATENT DOCUMENTS

| | | |
|---|---|---|
| DE | 195 48 684 A1 | 6/1997 |
| DE | 10 2009 014 624 A1 | 9/2010 |

(Continued)

OTHER PUBLICATIONS

German Office Action dated Dec. 11, 2014 (Five (5) pages).

(Continued)

*Primary Examiner* — Jonathan M Dager
(74) *Attorney, Agent, or Firm* — Crowell & Moring LLP

(57) ABSTRACT

A method for monitoring a subsystem installed in a motor vehicle involves a diagnostic unit checking the subsystem for system errors at least during driving cycles of the motor vehicle, the check being carried out for an occurrence as well as for a correction of a system error. The diagnostic unit carries out a misuse assessment based on a frequency of detection of the occurrence and/or the correction of the system error in order to determine whether the detected occurrence and/or the detected correction of the system error is/are based on misuse. If occurrence of the system error is detected, a restricted operating mode is activated or an activated restricted operating mode is continued in which drivability of the vehicle is restricted after a predefinable number of driving cycles has elapsed or after a predefinable travel distance has passed without the correction of the system error being detected.

24 Claims, 1 Drawing Sheet

(56) References Cited

U.S. PATENT DOCUMENTS

| | | | |
|---|---|---|---|
| 7,685,810 B2 | 3/2010 | Hirata et al. | |
| 7,765,797 B2 | 8/2010 | Duvinage et al. | |
| 7,842,267 B2 * | 11/2010 | Nishina | B01D 53/90 423/235 |
| 8,718,905 B2 * | 5/2014 | Mosher et al. | 701/115 |
| 2002/0123833 A1 * | 9/2002 | Sakurai et al. | 701/33 |
| 2006/0265594 A1 | 11/2006 | Kuhls et al. | |
| 2007/0018830 A1 * | 1/2007 | Inoue | B60R 25/00 340/572.4 |
| 2007/0043951 A1 | 2/2007 | Grill et al. | |
| 2007/0277502 A1 * | 12/2007 | Duvinage | F01N 3/208 60/274 |
| 2008/0147265 A1 * | 6/2008 | Breed | 701/30 |
| 2009/0030570 A1 * | 1/2009 | Regnard De Lagny | G07C 5/0816 701/33.4 |
| 2011/0231053 A1 * | 9/2011 | Kuramochi et al. | 701/29 |
| 2012/0226397 A1 * | 9/2012 | Sopko et al. | 701/22 |
| 2012/0296567 A1 * | 11/2012 | Breed | G01C 21/26 701/468 |
| 2013/0024066 A1 * | 1/2013 | Geilen | G07C 5/0808 701/29.6 |
| 2013/0116881 A1 * | 5/2013 | Bogema | F02D 41/22 701/29.2 |
| 2013/0249682 A1 * | 9/2013 | Van Wiemeersch | B60R 25/1004 340/426.24 |
| 2014/0032041 A1 * | 1/2014 | Widmann et al. | 701/34.4 |
| 2014/0104048 A1 * | 4/2014 | De Kock | G08B 13/1654 340/429 |
| 2014/0260216 A1 * | 9/2014 | Everard | F01N 3/208 60/301 |
| 2015/0166357 A1 * | 6/2015 | Yezerets | G08B 13/00 423/265 |
| 2016/0146080 A1 * | 5/2016 | Maillard | F01N 3/2066 73/114.75 |

FOREIGN PATENT DOCUMENTS

| | | |
|---|---|---|
| EP | 1 760 623 A2 | 3/2007 |
| JP | 2005-147118 A | 6/2005 |
| JP | 2006-177317 A | 7/2006 |
| JP | 2007-522370 A | 8/2007 |
| JP | 2009-67091 A | 4/2009 |
| WO | WO 2005/093668 A1 | 10/2005 |

OTHER PUBLICATIONS

German Search Report dated Sep. 18, 2014 with partial English-language translation (Thirteen (13) pages).
Partial English translation of Japanese Office Action dated Feb. 24, 2015 (two (2) pages).
Japanese Office Action issued in Japanese counterpart application No. 2014-513917 dated Dec. 8, 2015, with partial English translation (Six (6) pages).
International Search Report with English translation dated May 10, 2012 (8 pages).
German-language Written Opinion dated May 10, 2012 (6 pages).

* cited by examiner

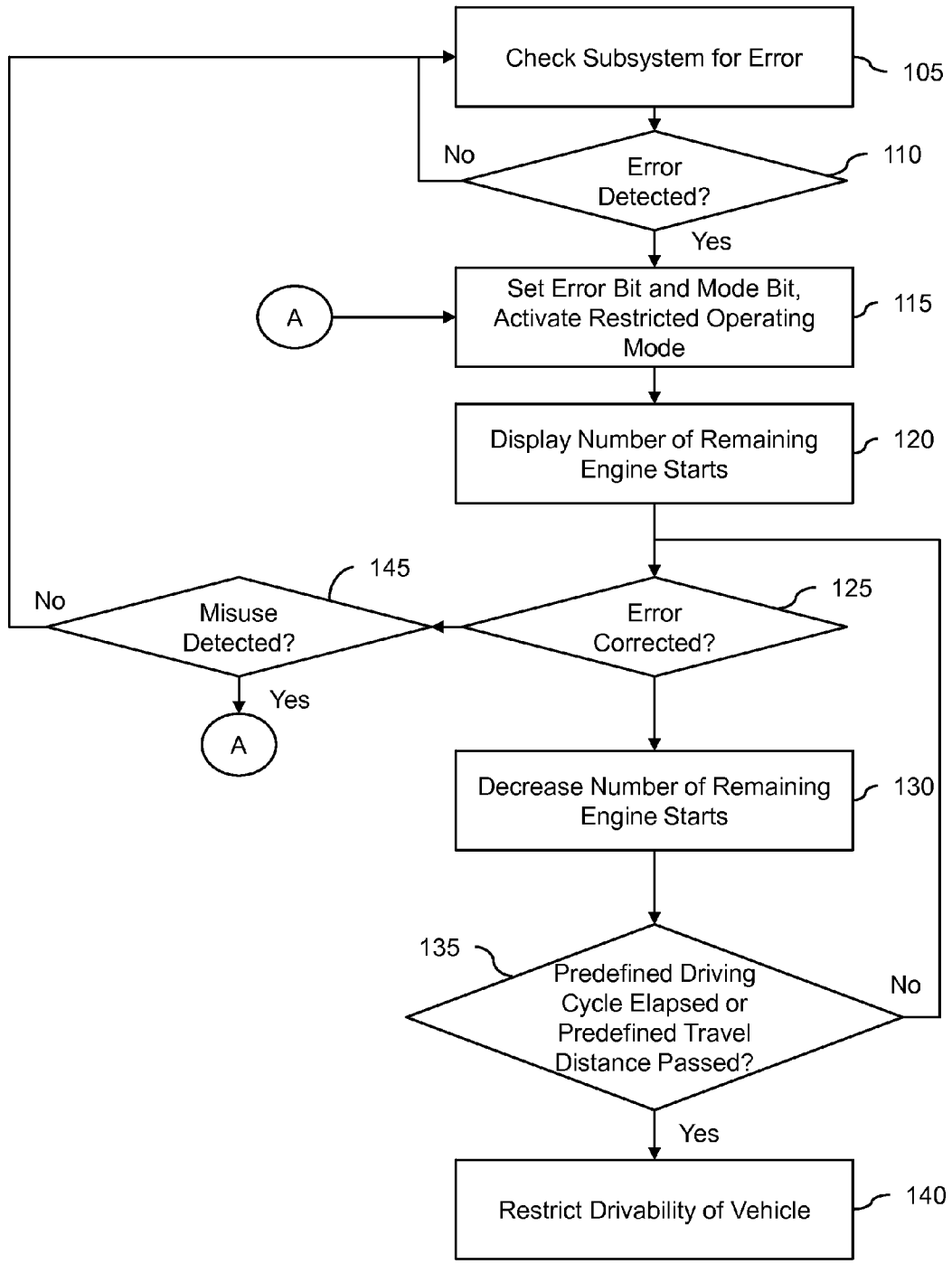

METHOD FOR MONITORING A SUBSYSTEM INSTALLED IN A MOTOR VEHICLE

BACKGROUND AND SUMMARY OF THE INVENTION

Exemplary embodiments of the present invention relate to a method for monitoring a subsystem installed in a motor vehicle.

Subsystems installed in motor vehicles, for example coolant systems, lubricant systems, occupant restraint systems, or other safety systems and the like are typically subject to monitoring for proper functioning, i.e., system error. A system error is usually displayed to the driver of the motor vehicle, who is prompted to correct the error.

Thus, a method is described in German patent document DE 195 48 684 A1, for example, in which exhaust gas-relevant malfunctions of a motor vehicle, which has an internal combustion engine, are detected using on-board sensor means, documented, evaluated in a circuit unit, and optionally indicated by a malfunction light.

For regulatory or liability reasons it may be necessary to ensure correction of some system errors. This may also be the case when, although the system error correction apparently, or in fact, has taken place, impermissible intervention in the monitored subsystem has occurred which, for example, temporarily deactivates the display of the system error, in particular without the cause of the system error being eliminated in the intended manner. Such intervention is regarded as unacceptable misuse.

Exemplary embodiments of the present invention provide a method for monitoring a subsystem installed in a motor vehicle that allows improper system tampering to be detected as reliably as possible.

In the method according to the invention, a diagnostic unit checks the subsystem to be monitored for system errors, at least during driving cycles of the motor vehicle. The check is characteristically carried out for the occurrence as well as for the correction of a system error. The diagnostic unit carries out a misuse assessment based on a frequency of detection of the occurrence and/or the correction of the system error in order to determine whether the detected occurrence and/or the detected correction of the system error is/are based on misuse. If occurrence of a system error is detected, a restricted operating mode is activated or an activated restricted operating mode is continued in which drivability of the vehicle is restricted after a predefinable number of driving cycles has elapsed or after a predefinable travel distance has passed without the correction of the system error being detected.

The invention is based on the finding that in the event of detection of the occurrence or the correction of a system error, in the individual case it is usually not possible to reliably detect misuse. In contrast, in the event of multiple occurrences or corrections of a system error within a certain time period, travel distance, or a plurality of preferably successive driving cycles, misuse may be detected or also ruled out with a high degree of reliability by assessing the frequency of these events. For evaluating the presence of misuse, statistical methods may also advantageously be used which assess the frequency of the detected events regarding the occurrence and/or correction of the system error. The frequency may be used as the basis for the misuse assessment within the meaning of an absolute frequency, i.e., as the number of events regarding the occurrence and/or correction of the system error within a certain time period, travel distance, or a number of preferably successive driving cycles. However, a relative frequency may also be used, in which the detected number of events regarding the occurrence and/or correction of the system error is considered with regard to another number of driving cycles, in particular an overall number of driving cycles, or to a number of driving cycles without error detection. Misuse is considered to be present when the occurrence or the correction of a system error is attributable to an intervention in the subsystem impermissibly carried out by the vehicle user, in particular performed intentionally. An example of such is intentionally switching off a monitoring function or a system component without a technically meaningful reason.

According to the invention, the provided diagnostic unit checks the subsystem at least during driving cycles of the motor vehicle. A driving cycle is considered to be an uninterrupted time period between starting the engine and subsequently switching off the engine, the time period including a driving operation of the vehicle. The state of operational readiness for the vehicle or the engine or the subsystem (ignition on) is preferably also included.

For detecting the occurrence or the correction of a system error, the diagnostic unit may detect and process signals from sensors and/or operating state variables of the motor vehicle or the engine. When the occurrence of a system error is detected, a restricted operating mode is activated, or for the case that the restricted operating mode has already been activated, is continued. The restricted operating mode provides that the drivability of the vehicle is restricted after a predefinable number of driving cycles has elapsed or after a predefinable travel distance has passed without the correction of the system error being detected. This is preferably indicated to the operator of the vehicle. The restriction of the driving operation may include, for example, a limitation of the engine power or of the travel speed, or prevention of the engine from being restarted after it is switched off. If the system error is not corrected in a timely manner in the activated restricted operating mode, it is provided that the restriction of the driving operation automatically becomes active.

The monitored subsystem of the motor vehicle may be, for example, a coolant system, a lubricant system, an occupant restraint system, or some other safety system. Subsystems may also be monitored that themselves carry out functional tests, for example regarding overloading of the vehicle, vehicle door locking, and the like.

In one embodiment of the invention, the monitored subsystem is an exhaust aftertreatment system associated with an internal combustion engine of the motor vehicle. The exhaust aftertreatment system may include catalytic converters for exhaust gas control, particle filters, and components for proper operation thereof, such as exhaust gas sensors, valves, etc.

In one preferred embodiment of the invention, the monitored subsystem is a selective catalytic reduction (SCR) exhaust aftertreatment system for reducing nitrogen oxides contained in the exhaust gas of the internal combustion engine, and the diagnostic unit checks the SCR exhaust aftertreatment system for consumption-relevant system errors, which in comparison to an error-free SCR exhaust aftertreatment system result in a significantly decreased consumption of an SCR reducing agent provided for nitrogen oxides reduction.

The SCR exhaust aftertreatment system typically includes a so-called SCR catalytic converter that can catalyze a reduction of nitrogen oxides, with excess oxygen, by means of the reducing agent. The reducing agent is stored in a storage container onboard the motor vehicle and is supplied by means of a metering system to the exhaust gas upstream from the SCR catalytic converter for nitrogen oxides reduction. Aqueous urea solution is typically used as reducing agent. However, other reducing agents which in particular contain ammonia, such as solid urea, carbamate, amines, ammonia-containing complexed compounds or the like, may also be used. The metering system, storage container, catalytic converter, and other components used for the proper operation of the SCR exhaust aftertreatment system are included as part of the SCR exhaust aftertreatment system. The diagnostic unit monitors or checks the functioning of the components of the SCR exhaust aftertreatment system, at least in part.

The consumption of the reducing agent is associated with operating costs. It is therefore provided that the diagnostic unit detects misuse that serves to avoid or reduce these operating costs. If the consumption of the reducing agent is significantly less than a quantity that is customary for a particular operating state, the intended or prescribed nitrogen oxides reduction is also impaired or prevented. For this reason, recognized errors in the SCR exhaust aftertreatment system are detected and preferably displayed. A significant decrease in consumption is understood to be a decrease by at least 20%, preferably by at least 30% or more, compared to the quantity provided for error-free operation of the SCR exhaust aftertreatment system. In particular, a significant decrease is understood to mean a consumption of the SCR reducing agent that is at least practically zero. To initiate error correction with a certain degree of reliability, a restricted operating mode is preferably activated or continued at the same time that the error is detected. Misuse which would result in impermissibly delaying or avoiding the error correction may thus be excluded. At the same time, it is necessary to rule out or detect misuse that prevents initiation of the restriction in drivability without the significant decrease in reducing agent consumption, which is the cause, being permanently eliminated.

For this purpose, in one particularly advantageous further embodiment of the invention a memory is provided for the diagnostic unit which has memory locations for at least status information determined in the driving cycles, the status information concerning at least the occurrence and/or the correction of a consumption-relevant system error and/or the active switching of the restricted operating mode, and status information for a plurality of successive driving cycles being stored in the memory and used, at least in part, for the misuse assessment. Due to the plurality of memory locations for status information provided according to the invention, the frequency of a system error recognition or correction may be detected and evaluated in a particularly reliable manner, so that misuse may be recognized in a particularly reliable manner. A statistical analysis of status information stored over a plurality of driving cycles is also advantageously made possible.

In another embodiment of the invention, in the activated restricted operating mode a number of remaining engine starting operations allowed for normal vehicle operation or a value of a remaining travel distance may be decremented, beginning with a predefinable starting value. Engine starting operations that are allowed for normal vehicle operation are preferably understood to mean engine starts that meet predefined boundary conditions which, for example, contain a subsequent minimum travel distance or minimum engine operating time. A premature restriction of the driving operation without the vehicle user actually being at fault may thus be avoided. The activation and the course of the restricted operating mode are preferably displayed to the driver of the vehicle. The driver is thus informed on the one hand of the presence of the detected system error, and on the other hand, of the consequences of failure to correct the system error.

When the number of engine starting operations or the remaining travel distance has been decremented to zero, under normal circumstances it is no longer possible for the vehicle user to restart the engine or begin a new trip. However, service personnel authorized for this purpose are preferably provided with an option to access the diagnostic unit and allow one or more engine starts, or travel for an in particular predefinable further travel distance. A flexible response may thus be made to emergency situations. If the system error is corrected in a timely manner before the allowed remaining starting operations or the remaining travel distance have/has been decremented to zero, the diagnostic unit generally automatically deactivates the restricted operating mode and resets the starting value to its predefinable beginning value.

In another embodiment of the invention during normal operation, when correction of a system error is detected, a deactivation of the activated restricted operating mode is allowed only when the misuse assessment shows that no misuse is present. Alternatively or additionally, a detected error correction is considered invalid if the misuse assessment shows that misuse is present. This ensures that the system monitoring cannot be inactivated by in particular repeated or continued misuse. The normal operation is a customary vehicle operation intended for the user of the vehicle. This preferably does not include an intervention in the diagnostic unit or exchange or replacement of system components performed by authorized service personnel or in some other manner which are used to restore normal drivability which is prevented by technical malfunctions.

In particular to allow safety margins and to rule out misinterpretations or external influences on a decision regarding the restriction of drivability to the greatest extent possible, in another embodiment of the invention it is provided that a check for consumption-relevant system errors which is relevant for activating or continuing and/or deactivating the restricted operating mode requires the presence of a driving cycle which is assessed as valid, using predefinable values for at least a minimum travel duration and/or a minimum travel distance and/or a minimum vehicle speed and/or an engine standstill duration in a driving cycle and/or between two driving cycles. Additional conditions that must be present for the existence of a driving cycle to be assessed as valid may also be defined and queried. Provided that a driving cycle is not assessed as valid, according to this embodiment of the invention in particular there is no decrementing of the number of remaining starting operations or the remaining travel distance.

For assessing the frequency for detecting the occurrence and/or the correction of the system error with regard to misuse, in another embodiment of the invention status information stored in the memory of the diagnostic unit concerning the presence of a valid driving cycle and/or concerning active switching of the restricted operating mode of a plurality of preceding driving cycles is used for the misuse assessment. The decision or assessment regarding misuse may thus be statistically corroborated.

In another embodiment of the invention, for the misuse assessment a characteristic number is provided which is redetermined at least for each valid driving cycle, and misuse is considered to be present when the characteristic number reaches or exceeds a predefinable limit value. A further improvement in reliability of the misuse assessment is thus made possible. It has proven to be particularly advantageous when, in another embodiment of the invention, the characteristic number is correlated with the number of detected events regarding the occurrence and the correction of system errors. In particular, this allows reliable detection of repeated tampering via unauthorized interventions in the monitored subsystem.

In this regard, a further improvement in reliability is made possible when, in another embodiment of the invention, the characteristic number that is determined in at least each valid driving cycle is stored in a memory location of the memory of the diagnostic unit associated with the particular driving cycle, and the value of the characteristic number for the preceding driving cycle is used for determining the characteristic number associated with a particular driving cycle. It is advantageous to update the characteristic number during successive, in particular valid, driving cycles in order to be able to reliably distinguish intentional system interventions from random or properly occurring status changes.

Further advantages, features, and particulars of the invention result from the following description of preferred exemplary embodiments. The features and feature combinations mentioned above in the description, as well as the features and feature combinations mentioned below, are usable not only in the particular stated combination, but also in other combinations or alone without departing from the scope of the invention.

BRIEF DESCRIPTION OF THE DRAWING FIGURE

The sole FIGURE illustrates an exemplary method in accordance with the present invention.

DETAILED DESCRIPTION

With reference to Table 1 and the sole FIGURE, an advantageous procedure is explained in conjunction with status information listed in the table, which is entered in an error memory in a diagnostic unit. Without restricting universality, it is assumed that the diagnostic unit checks an SCR exhaust aftertreatment system of a motor vehicle internal combustion engine for system errors that result in significant underconsumption of urea solution provided for nitrogen oxides reduction (step 105). Such a system error may be, for example, an interruption in a power supply of a metering module or of a metering control unit for metering the urea solution.

or the correction of a system error has been detected in a system check, is entered in the second line. A mode bit M for a particular driving cycle F, which indicates whether a restricted operating mode is activated, which in the present case would restrict the number of remaining allowed engine starts for normal driving operation without resetting a set error bit B, is entered in the third line.

The number of remaining starts that may still be carried out after the associated driving cycle F has elapsed is entered in the fourth line. A misuse characteristic number $k_x$ which quantitatively indicates the result of the misuse assessment for the current driving cycle F which is carried out by the diagnostic unit is entered in the fifth, last line.

In the driving cycles F=n and F=n+1, which have been initiated by the vehicle user via an engine start or by providing the electrical operating voltage (ignition "on"), and terminated by shutting off the engine or switching off the electrical operating voltage (ignition "off"), no occurrence of a system error has been detected, and therefore the error bit B here is zero in each case. Thus, there is no reason for an error message or for activating a restricted operating mode. Accordingly, zero is entered for the mode bit M, and the same predefinable number R of allowed future starting operations is provided for the vehicle in each of the driving cycles F=n and F=n+1. In the present case, a malfunction display remains deactivated.

In the driving cycle F=n+2, a system error is detected ("Yes" path out of decision step 110), and therefore the error bit B is set, a restricted operating mode is activated, and the mode bit M is set (step 115). It is provided that the number of remaining engine starts, and thus the activation of the restricted operating mode, is displayed to the vehicle user, who is prompted to correct the error (step 120). As described above, provided that in the subsequent driving cycles F no error correction is detected ("No" path out of decision step 125) and therefore the error bit B and the mode bit M remain set, the number of allowed engine starts for continuing driving cycles F is decremented (step 130), beginning with the starting value R, until the number zero is reached in the driving cycle F=n+m+1 ("Yes" path out of decision step 135).

With regard to the misuse characteristic number $k_x$ in the xth driving cycle F, it is provided that the misuse characteristic number is defined at least as a function of a frequency of detection of the occurrence and/or the correction of the system error, and therefore preferably at least as a function of the number of entries of a set error bit B or mode

TABLE 1

| | Number of driving cycle F | | | | | | | | |
|---|---|---|---|---|---|---|---|---|---|
| | ... | n | n + 1 | n + 2 | n + 3 | n + 4 | ... | n + m | n + m + 1 | ... |
| Error bit B | ... | 0 | 0 | 1 | 1 | 1 | ... | 1 | 1 | ... |
| Mode bit M | ... | 0 | 0 | 1 | 1 | 1 | ... | 1 | 1 | ... |
| Remaining starts | ... | R | R | R | R − 1 | R − 2 | ... | 1 | 0 | ... |
| Characteristic number $k_x$ | ... | $k_n$ | $k_{n+1}$ | $k_{n+2}$ | $k_{n+3}$ | $k_{n+4}$ | ... | $k_{n+m}$ | $k_{n+m+1}$ | ... |

Table 1 presents, strictly by way of example, portions of entries in the memory of the diagnostic unit, which has a plurality of memory locations. The first line is associated with the number of directly successive driving cycles F, which in the present case are consecutively numbered. An error bit B for a particular driving cycle F, which indicates whether a system error is present or whether the occurrence bit M. The value of the misuse characteristic number $k_{x-1}$ in the particular preceding driving cycle F and an associated number of driving cycles F are likewise preferably taken into account. The following formal dependency therefore applies for the misuse characteristic number $k_x$:

$$k_x = f(k_{x-1}, F, \Sigma(M), \Sigma(B))$$

F stands for the number of driving cycles used for the misuse assessment, $\Sigma(M)$ stands for the number of associated memory locations having a set mode bit M, and $\Sigma(B)$ stands for the number of associated memory locations having a set error bit B. It may also be provided that one or more of the variables $k_{x-1}$, F, $\Sigma(M)$, $\Sigma(B)$ is/are not taken into account, or that additional status entries, not separately described here, are taken into account as variables. Various functional dependencies f( ) may be provided for linking the variables $k_{x-1}$, F, $\Sigma(M)$, $\Sigma(B)$ which are preferably taken into account, and which in particular are based on an assessment of the frequency of detection of the occurrence and/or the correction of the system error, i.e., which take into account the frequency of the entries of a set error bit B or mode bit M. This is achieved by the dependency of the characteristic number $k_x$ on the variable $\Sigma(M)$ or a variable which is correlated therewith. If the misuse characteristic number $k_x$ reaches or exceeds a predefinable or predefined limit value, misuse is considered to be present ("Yes" path out of decision step 145). Use is thus advantageously made of the knowledge that when there is a comparatively large number or frequency of error entries, a normal technical cause of error is comparatively less probable, and instead an impermissible, improper intervention is more probable.

Following the driving cycle F=n+m+1, in which the number of possible engine starting operations has been decremented to zero ("Yes" path out of decision step 135), various further procedures or responses may be provided (step 140), which preferably depend on whether the misuse characteristic number $k_x$ has already reached or exceeded the critical limit value for misuse detection during or prior to this driving cycle F. In any case, it is provided that an attempt to start the engine directly after the driving cycle F=n+m+1 remains unsuccessful at least if no error correction has been detected or the error bit B is set. For example, as the result of an externally authorized service intervention in the diagnostic unit, resetting of the remaining starts to the starting value R may be provided, after which at least R engine starting operations are once again made possible. Resetting to a smaller starting value R'<R may also be provided, in particular if a system error has been detected again during the subsequent driving cycle. As the result of such an authorized service intervention provided in particular for exceptional cases or emergency situations, resetting of the error bit to zero may also be allowed. Such service interventions are preferably reserved for service personnel who are authorized for this purpose.

If the misuse characteristic number $k_x$ has already reached or exceeded the critical limit value for misuse detection in the driving cycle F=n+m+1, it is preferably provided to allow resetting of the remaining starts only to a reduced starting value R'<R compared to R, or to a further reduced or starting value R"<R' by an in particular authorized service intervention in the diagnostic unit. This is also preferably provided if, prior to a remaining starting value which has been decremented to zero, the misuse characteristic number $k_x$ has already reached or exceeded the critical limit value, even though an error correction has been detected and the error bit B has been reset.

If in the activated restricted operating mode, prior to a remaining starting value being decremented to zero, an error correction is detected and optionally the error bit B is reset, and the misuse characteristic number $k_x$ has not reached or exceeded the critical limit value, it is provided that the remaining starting value is reset to the starting value R, and the mode bit M is reset. It is preferably provided that the misuse characteristic number $k_x$ is updated instead of being reset in order to allow more reliable assessment of subsequent status changes, taking the history into account.

It is understood that the memory may have additional memory locations for further status information, not separately described here. In particular, memory cells for status information with regard to a validity rating of the current driving cycle and/or of a performed system check, etc. may be provided. These memory cells may likewise be used for the misuse assessment and for determining the misuse characteristic number $k_x$.

It is further understood that during an authorized service due to a remaining starting value which has been decremented to zero, an analysis of system components with regard to actual malfunctions having a technical cause is carried out. If a technical cause of error is identified, the diagnostic entries which are used for the misuse assessment are also preferably reset in the course of the authorized service operation. The misuse characteristic number $k_x$ is also preferably reset.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for monitoring a subsystem installed in a motor vehicle, the method comprising:
    checking, by a diagnostic unit, the subsystem for system errors at least during driving cycles of the motor vehicle, wherein the check is performed for an occurrence of a system error and a correction of the system error;
    performing, by the diagnostic unit, a misuse assessment based on a frequency of detection of the occurrence and the correction of the system error in order to determine whether the detected occurrence and the detected correction of the system error is based on misuse, wherein misuse is the occurrence of the system error or the correction of the system error due to an intervention in the subsystem impermissibly carried out by a user of the motor vehicle,
    activating a restricted driving mode or continuing an activated restricted driving mode if occurrence of the system error is detected, wherein in the restricted driving mode drivability of the vehicle is restricted after
        a predefined number of driving cycles has elapsed without the correction of the system error being detected, or
        a predefined travel distance has passed without the correction of the system error being detected.

2. The method according to claim 1, wherein the monitored subsystem is an exhaust aftertreatment system associated with an internal combustion engine of the motor vehicle.

3. The method according to claim 1, wherein the monitored subsystem is a selective catalytic reduction (SCR) exhaust aftertreatment system for reducing nitrogen oxides contained in the exhaust gas of the internal combustion engine, and the diagnostic unit checks the SCR exhaust aftertreatment system for consumption-relevant system errors, which in comparison to an error-free SCR exhaust aftertreatment system result in a significantly decreased consumption of an SCR reducing agent provided for nitrogen oxides reduction.

4. The method according to claim 1, wherein a memory is provided for the diagnostic unit which has memory locations for at least status information determined in the driving cycles, the status information concerning at least the occurrence or the correction of a consumption-relevant system error, or active switching of the restricted operating mode, and status information for a plurality of successive driving cycles is stored in the memory and used, at least in part, for the misuse assessment.

5. The method according to claim 1, wherein in the activated restricted operating mode a number of remaining engine starting operations allowed for normal vehicle operation or a value of a remaining travel distance is decremented, beginning with a predefined starting value.

6. The method according to claim 1, wherein during normal operation, when correction of a system error is detected a deactivation of the activated restricted operating mode is allowed only when the misuse assessment shows that no misuse is present, or a detected error correction is considered invalid if the misuse assessment shows that misuse is present.

7. The method according to claim 2, wherein during normal operation, when correction of a system error is detected a deactivation of the activated restricted operating mode is allowed only when the misuse assessment shows that no misuse is present, or a detected error correction is considered invalid if the misuse assessment shows that misuse is present.

8. The method according to claim 3, wherein during normal operation, when correction of a system error is detected a deactivation of the activated restricted operating mode is allowed only when the misuse assessment shows that no misuse is present, or a detected error correction is considered invalid if the misuse assessment shows that misuse is present.

9. The method according to claim 1, wherein a check for consumption-relevant system errors relevant for activating, continuing, or deactivating the restricted operating mode requires presence of a driving cycle that is assessed as valid, using predefined values for at least a minimum travel duration, a minimum travel distance, a minimum vehicle speed, or an engine standstill duration in a driving cycle or between two driving cycles.

10. The method according to claim 2, wherein a check for consumption-relevant system errors relevant for activating, continuing, or deactivating the restricted operating mode requires presence of a driving cycle that is assessed as valid, using predefined values for at least a minimum travel duration, a minimum travel distance, a minimum vehicle speed, or an engine standstill duration in a driving cycle or between two driving cycles.

11. The method according to claim 3, wherein a check for consumption-relevant system errors relevant for activating, continuing, or deactivating the restricted operating mode requires presence of a driving cycle that is assessed as valid, using predefined values for at least a minimum travel duration, a minimum travel distance, a minimum vehicle speed, or an engine standstill duration in a driving cycle or between two driving cycles.

12. The method according to claim 1, wherein status information stored in the memory of the diagnostic unit concerning presence of a valid driving cycle or concerning active switching of the restricted operating mode of a plurality of preceding driving cycles is used for the misuse assessment.

13. The method according to claim 2, wherein status information stored in the memory of the diagnostic unit concerning presence of a valid driving cycle or concerning active switching of the restricted operating mode of a plurality of preceding driving cycles is used for the misuse assessment.

14. The method according to claim 3, wherein status information stored in the memory of the diagnostic unit concerning presence of a valid driving cycle or concerning active switching of the restricted operating mode of a plurality of preceding driving cycles is used for the misuse assessment.

15. The method according to claim 9, wherein for the misuse assessment a characteristic number is provided that is redetermined at least for each valid driving cycle, and misuse is considered to be present when the characteristic number reaches or exceeds a predefined limit value.

16. The method according to claim 10, wherein for the misuse assessment a characteristic number is provided that is redetermined at least for each valid driving cycle, and misuse is considered to be present when the characteristic number reaches or exceeds a predefined limit value.

17. The method according to claim 12, wherein for the misuse assessment a characteristic number is provided that is redetermined at least for each valid driving cycle, and misuse is considered to be present when the characteristic number reaches or exceeds a predefined limit value.

18. The method according to claim 13, wherein for the misuse assessment a characteristic number is provided that is redetermined at least for each valid driving cycle, and misuse is considered to be present when the characteristic number reaches or exceeds a predefined limit value.

19. The method according to claim 15, wherein the characteristic number is correlated with the number of detected events regarding the occurrence and the correction of system errors.

20. The method according to claim 17, wherein the characteristic number is correlated with the number of detected events regarding the occurrence and the correction of system errors.

21. The method according to claim 15, wherein the characteristic number that is determined in at least each valid driving cycle is stored in a memory location of the memory of the diagnostic unit associated with the particular driving cycle, and the value of the characteristic number for the preceding driving cycle is used for determining the characteristic number associated with a particular driving cycle.

22. The method according to claim 17, wherein the characteristic number that is determined in at least each valid driving cycle is stored in a memory location of the memory of the diagnostic unit associated with the particular driving cycle, and the value of the characteristic number for the preceding driving cycle is used for determining the characteristic number associated with a particular driving cycle.

23. The method according to claim 19, wherein the characteristic number that is determined in at least each valid driving cycle is stored in a memory location of the memory of the diagnostic unit associated with the particular driving cycle, and the value of the characteristic number for the preceding driving cycle is used for determining the characteristic number associated with a particular driving cycle.

24. The method according to claim 20, wherein the characteristic number that is determined in at least each valid driving cycle is stored in a memory location of the memory of the diagnostic unit associated with the particular driving cycle, and the value of the characteristic number for the preceding driving cycle is used for determining the characteristic number associated with a particular driving cycle.

* * * * *